2,867,944

METHOD OF TREATING SOIL BY NON-IONIC SURFACE ACTIVE AGENTS

Lawrence W. Fletcher, Havertown, Pa., assignor to Agronomists' Research Corporation, a corporation of Delaware No Drawing. Application April 20, 1954
Serial No. 424,513

18 Claims. (Cl. 47—58)

The present invention relates to a novel method of treating soil to improve certain properties thereof; and, more particularly, the present invention relates to a method for improving the water-penetration, water-absorption and water retention properties of soil.

It has long been known that organic matter, such as humus, in soil helps the soil to absorb and retain moisture and improves the ability of the soil surface to be penetrated by water. More recently there have become available synthetic polymeric materials which, when applied to soil, improve the water penetration properties and other characteristics of the soil by altering the soil's structure. This involves the agglomeration of the finer silt and clay particles into larger, more porous aggregates. Often there is caking or crusting at the surface of the soil when such materials are employed. Moreover, these polymers are relatively expensive, and this factor has, in some instances, discouraged widespread use of such materials.

It is the principal object of the present invention to provide a novel method of treating soil to improve the water penetration, absorption and retention properties of soil.

Another object of the invention is to provide a novel method of treating soil to improve the water penetration, absorption and retention properties thereof which is relatively inexpensive and does not involve the danger of crusting or caking at the surface of the treated soil.

Other objects of this invention will become apparent from a consideration of the following specification and claims.

The process of the present invention comprises applying to soil a non-ionic surface active agent.

It has been found that the application of a non-ionic surface active agent to soil, either in the form of an aqueous solution or in dry, finely-divided form which will subsequently become dissolved in the soil moisture or moisture applied to the soil, markedly increases the ability of the so-treated soil to absorb and retain moisture and to be penetrated by rain or other applied moisture. The utility of this method is apparent. Soils which permit rain and other applied moisture to run off before penetrating into the soil sufficiently can readily be converted into a soil into which rain and other applied moisture will penetrate more readily. The underlying soil will more readily absorb this moisture and will retain it longer than the same soil untreated.

It has been found that the non-ionic surface active agents are inert to the electrolyte compounds normally contained in soil, and, hence, will not be adversely affected thereby. Cationic and anionic surface active agents, on the other hand, are adversely affected by salts and other compounds normally contained in soil. Furthermore, the non-ionic surface active agents employed in accordance with the present invention are less likely deleteriously to affect beneficial bacteria normally contained in soil than are cationic and anionic surface active agents.

As stated, in accordance with the present invention, a non-ionic surface active agent is applied to the soil to be treated. Non-ionic surface active agents are molecules made up of hydrophilic and hydrophobic components. In such surface active agents, hydroxyl groups and ether linkages are chiefly depended upon to provide the hydrophilic action. Non-ionic surface active agents do not ionize and it is because of this that they are comparatively insensitive to electrolytes. The agents employed in accordance with the present invention will, of course, at least have some significant solubility in water. Examples of such materials are the alkyl aryl polyether alcohols, including the polyethylene glycol ethers of alkylated phenols, the polyethylene glycol esters of rosin, and the corresponding higher polyalkylene glycol derivatives, such as the polypropylene glycol derivatives; the partial esters of fatty acids and hexitol anhydride, such as sorbitan monolaurate, sorbitan monooleate, sorbitan trioleate, and the like; the polyoxyethylene addends of the partial esters of fatty acids and hexitol anhydride, such as polyoxyethylene sorbitan monolaurate, polyoxyethylene sorbitan monopalmitate, polyoxyethylene sorbitan monostearate, polyoxyethylene sorbitan monooleate, and the like; the ethylene oxide addends of fatty acids, such as polyoxyethylene stearate, and the like; polyoxyethylene lauryl alcohol, and the like.

In applying the non-ionic surface active agent to soil in accordance with the process of the present invention, the agent will normally be admixed with a vehicle. The vehicle may be water, or may be a finely-divided solid, such as sand, clay, or the like. Plant growth materials such as plant stimulants, hormones, and the like, may be included with the surface active agent for their intended purposes. When the agent is applied as an aqueous dispersion or solution thereof, the dispersion or solution is preferably substantially free of materials which are immiscible with water and which are dispersible by the surface active agent. In other words, it is preferred that the surface active agent not be relied upon to disperse, or act as an emulsifying agent for, a water-insoluble additive otherwise its effectiveness for the purposes of improving the properties of the soil in accordance with the present invention may be impaired.

The concentration of the surface active agent in the vehicle may vary widely, since, as will appear hereinafter, the important factor is the amount of surface active agent applied to a given quantity of soil, and the vehicle is included primarily to facilitate application of the desired amount of non-ionic surface active agent over a given area of ground. The concentration of the surface agent in the vehicle may depend, to some extent, upon the type of vehicle employed. Thus, when the vehicle employed is water, it has been found that, in order to disperse the agent over the requisite area of soil, the concentration of the agent in the water should be relatively low. It has been found that a concentration of between about .2% and about 5%, by weight, of the agent in water is satisfactory, and a concentration between about .5% and about 3% is preferred. When the agent is admixed with a finely-divided, solid vehicle, the concentration thereof in the vehicle may be much higher in view of the greater ease of distribution of a solid material, and in this case the concentration of the surface active agent may range up to about 85% by weight, of the mixture. Of course, the material may be marketed as a concentrate, reliance being placed upon the user to add an appropriate amount of vehicle, such as water, according to directions before application of the surface active agent to the soil.

The amount of agent actually applied to the soil may also vary somewhat depending upon the nature of the soil and the degree of improvement desired. The amount applied, however, will generally be between about 5 and about 50 lbs. per acre.

No problem will be encountered in the actual application of the material to the soil, and any desired means commensurate with the nature of the composition, that is whether it is in liquid or finely-divided solid form, may be employed. When the surface active agent is dispersed or dissolved in water, it is advantageously applied to the soil as fine droplets as by spraying. When the agent is in finely-divided solid form it may be dusted or scattered onto the surface of the soil, or mixed into the soil. When the material is applied to the surface of the soil, water applied therewith or subsequently will cause it to penetrate into the soil, and subsequent working of the soil will further disperse the agent in the soil.

To illustrate the marked improvement in penetration and absorption properties afforded by the use of the non-ionic surface active agent in accordance with the present invention, samples of three different soils are reduced to pass through a 16 mesh sieve. The material is then dried for approximately 3 hours at 300° F. One sample is a clay and the other samples are of garden soils from two different localities. Glass tubes 4 centimeters in diameter and approximately 23 centimeters in length were employed. Rolled paper plugs were placed in the tubes to act as support for the soil. Portions of the various samples are filled into separate glass tubes to the height of 10 centimeters (upon gentle tapping). One tube of each soil sample is employed as a control to which 50 ml. of plain tap water are added, and to another tube of each of the soil samples, is applied 50 ml. of an aqueous solution containing 1% of alkyl aryl polyether alcohol (Triton X–100, manufactured and sold by Rohm & Haas Co.). The time required for the first evidence of penetration through the column of soil is noted and designated "Time of first contact" and the time required for complete penetration of the column is noted and designated "Complete wetting."

The results are tabulated as follows:

|  | Soil A | | Soil B | | Soil C | |
| --- | --- | --- | --- | --- | --- | --- |
|  | Control | Treated | Control | Treated | Control | Treated |
| Time of first contact (Min.) | 40 | 20 | 21 | 14 | 15 | 9 |
| Complete Wetting (Min.) | 150 | 33 | 52 | 26 | over 40 | 36 |

To illustrate water retention properties of the treated soil, the samples were permitted to stand for a period of many days with periodic observation. The control samples of soils A, B and C, respectively, were apparently completely dry at the end of 7, 10 and 11 days, respectively. At the end of these periods, the corresponding treated samples still retained most of the moisture with only a thin top layer, about 2 cm. in depth, exhibiting apparent dryness. After 14, 20 and 22 days, respectively, treated soils A, B and C still contained moisture although the layer of apparent dryness had increased in depth.

As a further illustration of water absorption improvement, additional samples of soil C were placed in glass containers having a diameter of about 5 cm. to a depth of 10 cm. To one, the control, were added 10 ml. of plain water merely wetting the top layer. To another were added 10 ml. of a 10% solution of the alkyl aryl polyether alcohol. After two hours, 100 ml. of plain water were added gradually to each container. In the treated sample, all the added water was immediately absorbed by the soil; whereas, after about 80 ml. of water had been added to the control, the soil had substantially lost its ability to absorb further water and the remaining water, for the most part, remained on the surface, and after 12 hours there was still a layer of 2–3 ml. of free water remaining on the surface.

Considerable modification is possible in the selection of the non-ionic surface active agent employed, as well of other ingredients, and the concentration and amounts thereof, without departing from the scope of the present invention.

I claim:

1. The method of treating soil to improve its water penetration, absorption and retention properties which comprises applying thereto a composition consisting essentially of a non-ionic surface active agent and a vehicle therefor.

2. The method of claim 1 wherein the non-ionic surface active agent is applied in an amount between about 5 and about 50 lbs. per acre.

3. The method of treating soil to improve its water penetration, absorption and retention properties which comprises applying thereto a composition consisting essentially of an aqueous solution of a non-ionic surface active agent.

4. The method of claim 3 wherein the concentration of non-ionic surface active agent in the water is between about .2% and about 5%, by weight.

5. The method of claim 4 wherein the concentration of the non-ionic surface active agent in the water is between about .5% and about 3%, by weight.

6. The method of treating soil to improve the water penetration, absorption and retention properties which comprises applying thereto a composition consisting essentially of an aqueous solution of a non-ionic surface active agent in an amount between about 5 and about 50 lbs. per acre.

7. The method of claim 6 wherein the concentration of non-ionic surface active agent in the water is between about .2% and about 5%, by weight.

8. The method of treating soil to improve its water penetration, absorption and retention properties which comprises applying thereto a finely-divided mixture consisting essentially of a non-ionic surface active agent dispersed in a finely-divided solid vehicle.

9. The method of claim 8 wherein the amount of non-ionic surface active agent applied is between about 5 and about 50 lbs. per acre.

10. The method of claim 3 wherein the non-ionic surface active agent comprises a partial ester of a fatty acid and hexitol anhydride.

11. The method of claim 10 wherein the partial ester of a fatty acid and hexitol anhydride comprises sorbitan monolaurate.

12. The method of claim 10 wherein the partial ester of a fatty acid and hexitol anhydride comprises sorbitan monooleate.

13. The method of treating soil to improve its water penetration, absorption and retention properties which comprises applying thereto an aqueous solution consisting essentially of an alkyl aryl polyether alcohol.

14. The method of treating soil to improve its water penetration, absorption and retention properties which comprises applying thereto an aqueous solution comprising a polyethylene glycol ether of an alkylated phenol.

15. The method of treating soil to improve its water penetration, absorption and retention properties which comprises applying thereto an aqueous solution comprising a polyethylene glycol ester of rosin.

16. The method of claim 13 wherein said alkyl aryl polyether alcohol is applied in an amount between about 5 and about 50 lbs. per acre.

17. The method of claim 14 wherein said polyethylene glycol ether of an alkylated phenol is applied in an amount between about 5 and about 50 lbs. per acre.

18. The method of claim 15 wherein said polyethylene glycol ester of rosin is applied in an amount between about 5 and about 50 lbs. per acre.

(References on following page)

References Cited in the file of this patent

UNITED STATES PATENTS

| | | | |
|---|---|---|---|
| 2,258,291 | Jones | Oct. 7, | 1941 |
| 2,289,974 | Leiby | July 14, | 1942 |
| 2,396,513 | Jones | Mar. 12, | 1946 |
| 2,412,510 | Jones | Dec. 10, | 1946 |
| 2,576,080 | Tischler | Nov. 20, | 1951 |
| 2,614,917 | Zukel | Oct. 21, | 1952 |
| 2,635,978 | Massengale | Apr. 21, | 1953 |
| 2,652,379 | Hedrick | Sept. 15, | 1953 |
| 2,751,368 | Yost | June 19, | 1956 |

OTHER REFERENCES

Hackh's Chemical Dictionary, Third Edition, published 1944, page 673.

Geoghegan: "Aggregate Formation in Soil. Influence of Some Microbial . . .," published before April 17, 1951, at Groningen, Netherlands, in Fourth International Congress of Soil Science, Amsterdam, 1950, Transactions, vol. 1, pages 198 through 201.

Raney: "Nonionic Surface Active Agents," published November 2, 1953, in Chemical and Engineering News, vol. 31, No. 44, pages 4521, 4522, 4523.

Sauchelli: "Surfactants in Fertilizers," published November 1953 in Agricultural Chemicals, vol. 8, No. 11, pages 32, 33, 34, 143, 145, 147.

Lambe et al.: "Altering Soil Properties With Chemicals," published February 8, 1954, in Chemical and Engineering News, vol. 32, No. 6, pages 488 through 492.